April 9, 1968
H. R. K. N. JANESCHITZ-KRIEGL ET AL
3,376,749
PRESSURE GAUGE
Filed Feb. 16, 1966
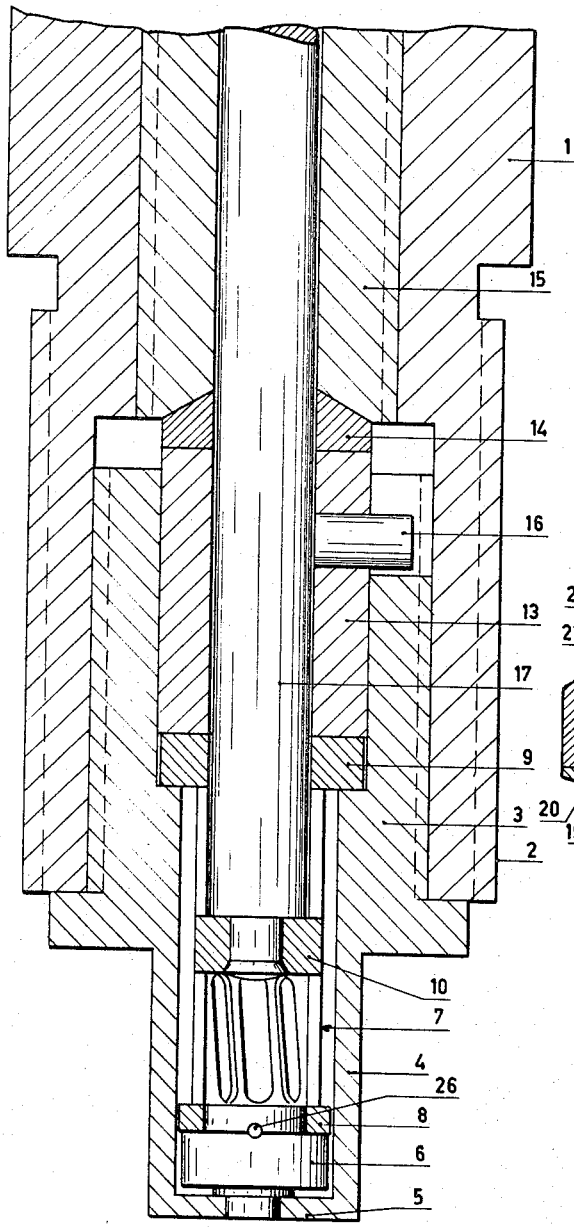
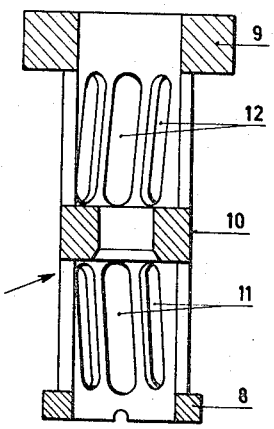
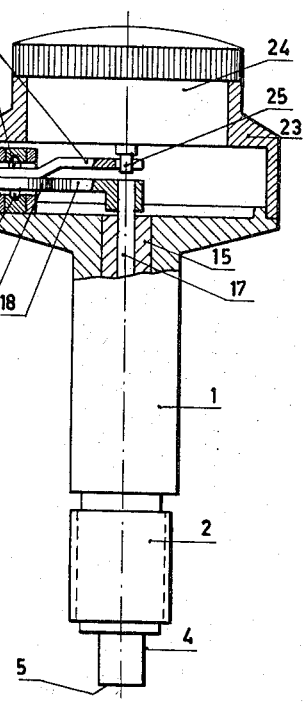
INVENTOR.
HERMANN R.K.N. JANESCHITZ-KRIEGL
JOHANNES SCHIJF
BY
Hammond and Littell

United States Patent Office 3,376,749
Patented Apr. 9, 1968

3,376,749
PRESSURE GAUGE
Hermann R. K. N. Janeschitz-Kriegl, Delft, and Johannes Schijf, The Hague, Netherlands, assignors to Nederlandse Organisatie Voor Toegepast-Natuurweten-Schappelijk Onderzoek ten Behoeve van Nijverheid, Handel en Verkeer (Organization for Industrial Research T.N.O.), a corporation of Netherlands
Filed Feb. 16, 1966, Ser. No. 527,987
2 Claims. (Cl. 73—406)

ABSTRACT OF THE DISCLOSURE

Describes a pressure gauge for extrusion or injection moulding presses having a central pin which is caused to rotate by variations of pressure within the press by means of a hollow, cylindrical torque converter which eliminates the effect of temperature on the gauge.

---

The present invention relates to a pressure gauge for measuring pressures in the mass occurring during extrusion or injection moulding of thermoplastic synthetic resins and rubbers, the said pressure gauge comprising a case which is to be fastened in the wall of the press and ends in a closed hollow cylinder, a pin for the transmission of the deflection of the bottom of the said cylinder and a device for determining the position of the pin relative to the case.

In the known pressure gauges of this type one end of the pin is supported by the bottom of the cylinder which is under the influence of the pressure in the mass, and the other end is pressed against a displacement meter. This meter can be of the mechanical type that can be read directly, a dial gauge, but it is usually provided with strain gauges, so that the displacement of the pin can be measured and registered by electrical means.

In using these known pressure gauges the problem arises of their high sensitivity to variations in temperature. These variations are a.o. caused by the temperature control, which switches the exterior heating and/or cooling off and on, and by changes in the surroundings of the machine. The case and the pin are not equally fast in following the variations in temperature, so that differences in temperature arise between them. The relative changes in length of the pin with respect to the case resulting herefrom cause deflections of the displacement meter, which mean errors in the measurement of pressures.

The errors introduced in this manner are by no means negligible. On one hand, this is due to the necessity to make the case, and, therefore, also the pin, fairly long, this in connection with the heating and cooling-mantles arranged around the press and in view of a sufficient cooling of the displacement meter. As a matter of fact, the press may have a temperature between 100 and 400° C. On the other hand, the deflection of the cylinder bottom, which is a measure for the pressure, is always very slight: it usually amounts only to a few hundredths of a millimetre. This means that the relative changes in length of the pin with respect to the case resulting from the variations in temperature, are of the same order of magnitude, so that with the known pressure gauges, measuring errors of 50% are no exception.

It is the object of the present invention to provide a pressure gauge, the measuring result of which is nearly unpertrubed by variations in temperature.

To this end, the pressure gauge according to the invention is provided with an element comprising three coaxial rings of about the same size, the central ring being connected with each of the other rings by means of a plurality of small rods which are arranged on both sides of the central ring in oppositely oblique positions, the said element being fixed in the case with one of the two outer rings and being pressed onto the centre of the cylinder bottom and safeguarded against rotation with the other outer ring by means of a thrust piece, the pin being connected to the central ring on one side and to a device for measuring the rotation of the pin on the other side.

In such a pressure gauge, thermal changes in length of the case and of the pin cannot exert any influence on the measuring result, as the measuring value is transmitted as a rotation of the pin. Only variations in temperature in or near the cylindrical end of the case can still give rise to measuring errors. However, these are very slight, as the deetrimental differences in temperature are restricted to parts, which are small compared with the pin, whilst, in addition, these smaller parts are faster in following the variations in temperature, so that the mutual differences in temperature of the parts are also slight.

The device for measuring the rotation of the pin can be a purely mechanical one and in that case it consists of a transmission and a dial gauge. For accurate pressure measurements and also when the pressure is to be recorded or the pressure gauge is to be incorporated in a control device, the use of an electric torsion meter is preferred.

As the deflection of the cylinder bottom is only slight, it is important that it should be converted into a rotation of the pin without free play and, as much as possible, without friction. To this end, the rods and the rings are formed as one piece from a hollow, mainly cylindrical body, in which oblique, slit-shaped openings are provided between the rings. As the changes in distance occurring between the rings are extremely small, the elastic deformation of the rods can provide sufficient freedom of movement of the rings.

The invention will be further elucidated hereinafter with the aid of a drawing showing an embodiment of the invention.

In this drawing:

FIG. 1 is a cross-section of the part of the pressure gauge that is to be fixed in the press;

FIG. 2 is a cross-section of a detail of this part; and

FIG. 3 shows the whole pressure gauge, partly in cross-section.

The end of the case 1, which can be mounted by means of screw thread 2 in the nozzle of an injection- or an extrusion-press, consists of inset piece 3, which is inserted with the aid of a screw thread. Piece 3 comprises the measuring cylinder 4 and the thin bottom 5. The thrust piece 6 is centred on and soldered to the bottom 5. Hereon is placed the element 7 which is safeguarded against rotation by the pin 26 and which converts the axial movements of the thrust piece to rotary movements.

The element 7, which is shown separately in FIG. 2, consists of a hollow cylinder having the ring-shaped thickened rim 8 at its lower end, the ring-shaped thickened rim 9 at its upper end and the ring-shaped thickened rim 10 in the middle between these two. Between the rims 8 and 10 are providd the slits 11 and between the rims 9 and 10 are provided the slits 12. These slits 11 and 12 are positioned obliquely in opposite directions at angles of about 15° relative to the axis of the element 7 and are evenly distributed over the periphery.

The element 7 has its rim 9 clamped in the inset piece 3 via the intermediate piece 13 and the pressure ring 14 by means of the hollow plug 15, and has its rim 8 pressed against the thrust piece 6, which latter is in its turn pressed onto the bottom 5 of the cylinder 4.

The intermediate piece 13 is provided with a pin 16, which protrudes into a notch countersunk in the inset piece 3 and thereby prevents rotating of the intermediate piece 13 and the rim 9 of the element 7 when the plug 15 is fastened.

The pin 17 is riveted in the rim 10 of the element 7. The pin 17 extends upwards beyond the case 1 and there carries a cogged segment 18, which interlocks with the second cogged segment 19. The segment 19 is carried by the bearings 20 and 21 and is connected with the arm 22, which is provided with a slit at its end.

The cap 23 containing the dial gauge 24, which constitutes a twist measuring device, is mounted on the case 1. This dial gauge is equipped with a pin 25, which fits into the slit of the arm 22, and belongs to the type which, when the pin 25 is shifted sideways by 0.01 mm. perpendicular to the plane of the drawing, gives a readable deflection.

The pressure gauge operates as follows:

When liquid pressure is exerted on the bottom 5, the bottom 5 will bend through in upward direction. This deformation gives rise to a displacement of the thrust piece 6, which is proportional to the liquid pressure, and to a corresponding shortening of the elegant 7, the rim 8 of which is supported on the thrust piece 6 and the rim 9 of which is clamped fast in the inset piece 3 of the case 1.

As a result of this shortening of the distance between the rims 8 and 9, those parts of the element 7, which are positioned between the slits 11 and the slits 12 and which form the connection rods between the rims 8 and 10 or 9 and 10 respectively, are forced to go through a tilting movement, during which they are elastically deformed near their places of junction with the rims.

This tilting movement gives rise to a rotation of the rim 10, the said rotation being transmitted by the pin 17 onto the segment 18 and causing a transverse displacement of the pin 25 of the dial gauge 24 via the segment 19 and the arm 22, so that the pointer of the dial gauge 24 deviates. The deviation of the pointer is proportional to the rotation of the pin 17, and therefore also to the degree of deformation of the bottom 5, so that the dial gauge gives a deviation, which is a direct measure for the pressure. The dial gauge 24 may therefore be provided with a graduation calibrated in units of pressure.

When there are variations in the temperature of the press wall, only differences in temperature between inset piece 3 with cylinder 4 on one side, and thrust piece 6 with element 7 on the other side, will bring about an erroneous deflection of the pressure gauge. However, due to the shortness of these parts and to the fairly large mutual heat contact, these deviations are extremely small and shortliving so that they do not disturb the reliability of the measurements.

We claim:

1. Pressure gauge for measuring pressures in the mass occurring during extrusion or injection moulding of thermoplastic resins and rubbers, the said pressure gauge comprising a substantially cylindrical case, means for mounting one end of said case to a corresponding hole in the wall of the press, a thin-walled measuring cylinder on said end of said case, a short thrust piece located in said measuring cylinder and connected to the bottom of it, an element for converting axial movements of said thrust piece to rotary movements, in pin connected to said element for transmitting the said rotary movements to the opposite end of the case, and a twist measuring device mounted in the said opposite end of the case and connected to said pin, said twist measuring device indicating the rotary movements of said pin, said element for converting axial movement to rotary movement comprising three coaxial rings of substantially equal size, the central ring being connected with each of the outer rings by means of a plurality of rods that are arranged in oppositely oblique positions, on both sides of the central ring, one of said outer rings being fixed in said cases, the other of said outer rings being in contact with said thrust piece and locked against rotation, and the central ring being connected to said transmission pin.

2. Pressure gauge for measuring pressures in the mass occurring during extrusion or injection moulding of thermoplastic resins and rubbers, the said pressure gauge comprising a substantially cylindrical case, means for mounting one end of said case to a corresponding hole in the wall of the press, a thin-walled measuring cylinder on said end of said case, a short thrust piece located in said measuring cylinder and connected to the bottom of it, an element for converting axial movements of said thrust piece to rotary movements, a pin connected to said element for transmitting the said rotary movements to the opposite end of the case, and a twist measuring device mounted in the said opposite end of the case and connected to said pin, said twist measuring device indicating the rotary movements of said pin, said element for converting axial movement to rotary movement comprising a hollow cylinder having an external rim at each end and an internal rim in the middle, said cylinder having helical slit-shaped openings between said rims, the helices on both sides of the central ring being sloped in opposite direction, one of said end rims being fixed in said case, the other of said end rims being in contact with said thrust piece and locked against rotation, and the central ring being connected to said transmission pin.

References Cited

UNITED STATES PATENTS

| 2,564,669 | 8/1951 | Brady | 73—407 |
| 3,162,795 | 12/1964 | Cherniak | 73—398 |
| 3,283,584 | 11/1966 | Coffing | 73—398 |

LOUIS R. PRINCE, *Primary Examiner.*

D. E. CORR, *Assistant Examiner.*